United States Patent [19]

Uchida et al.

[11] 4,127,628
[45] Nov. 28, 1978

[54] MOLDED GYPSUM PRODUCT AND PROCESS FOR PREPARING THE SAME

[75] Inventors: Mitsuo Uchida, Machida; Takeshi Fushiki, Tokyo; Mitsuru Awata, Yokohama, all of Japan

[73] Assignee: Mitsubishi Chemical Industries Ltd., Tokyo, Japan

[21] Appl. No.: 788,928

[22] Filed: Apr. 19, 1977

[30] Foreign Application Priority Data

Apr. 19, 1976 [JP] Japan .................. 51-44294

[51] Int. Cl.² .................................. B29H 7/20
[52] U.S. Cl. ............................ 264/42; 106/99; 264/86; 264/122; 264/333
[58] Field of Search ............. 264/42, 86, 87, 122, 264/333; 106/99

[56] References Cited

U.S. PATENT DOCUMENTS

| 2,655,710 | 10/1953 | Roensch | 264/87 |
| 2,738,285 | 3/1956 | Biefeld | 106/99 |
| 3,974,024 | 8/1976 | Yano | 264/42 |

FOREIGN PATENT DOCUMENTS 1,204,541 9/1970 United Kingdom ............ 264/86

Primary Examiner—Thomas P. Pavelko
Attorney, Agent, or Firm—Oblon, Fisher, Spivak, McClelland & Maier

[57] ABSTRACT

A molded gypsum product comprises a matrix of crystalline gypsum and reinforcing fibers of glass fiber and asbestos fiber uniformly distributed in said matrix in a multi-layer structure having at least one higher density layer and at least one lower density layer which is continuously adjacent to said higher density layer and having an average apparent bulk density of 0.3 to 0.9 g/cc.

4 Claims, 2 Drawing Figures

MOLDED GYPSUM PRODUCT AND PROCESS FOR PREPARING THE SAME

BACKGROUND OF THE INVENTION

1. Field of the Invention:

The present invention relates to a molded gypsum product which has a low average apparent bulk density of 0.3 to 0.9 g/cc and has high strength and a process for preparing the same.

2. Description of the Prior Art

Recently, a large amount of gypsum has been produced as by-products from waste gas desulfurization processes etc., From the viewpoints of environmental pollution and effective ulitization of sources, uses of the by-product gyspum in the fields of constructions, building materials and other industrial materials have been studied.

Thus, molded gypsum products have low strength as the single component product and have been improved to increase the strength by incorporating fiber reinforcing materials or by compression molding to form high density product.

When the gysum product are used as construction materials such as fire protection materials of steel frame structural parts of buildings or fire resistant partition wall for medium and high-rise buildings, light weight as well as high strength for required. Such reduction in weight of a gypsum product can be attained by imparting porosity to the product. The strength of the molded product having light weight and high strength.

Britifh Pat. No. 1,204,541 discloses the method of making fiber reinforced plaster wherein a mixture prepared by dispersing glass fiber in a slurry of hydraulic gypsum is fed in a mold and water was discharged from the mixture by compressing it to lower the water/plaster ratio to a value approaching but not below the minimum required to hydrate the plaster.

However, in the method, the strength of the molded product is increased by increasing the density at the sacrifice of weightlightening of the molded product, whereby the apparent bulk density of the molded product is remarkably high as 1.4 to 1.9 g/cc.

U.S. Pat. No. 3,862,881 discloses the molded lamellar gypsum products made of dihydrated gypsum having lamellar structure. In this patent, a molded product in produced by setting a hydraulic gypsum with water in a mold under pressure while removing excess water for setting, whereby the apparent bulk density of the molded product is as high as 1.5–2.2 g/cc.

Summary of the Invention

It is an object of the present invention to provide a novel molded gypsum product which has low average apparent density and high strength.

The foregoing and other objects of the present invention have been attained by providing a molded gypsum product which comprises a matrix of crystalline gypsum and reinforcing fibers of at least glass fiber and asbestos fiber uniformly distributed in said matrix in a multi-layer structure having at least one higher density layer and at least one lower density layer which is continuously adjacent to said higher density layer.

DETAILED DESCRIPTION OF THE PREFERRED EMBODIMENTS

The molded gypsum product of this invention comprises a matrix of a gypsum ($CaSO_4 \cdot 2H_2O$). The gypsum in the products of this invention have conventional crystal structure, conveniently obtained by hydrating α- or β-form gypsum hemihydrate ($CaSO_4 \cdot \frac{1}{2}H_2O$). The structure thus formed is one of those recognized such as needle-like, plate-like, pillar-like and particle-like and differs in the structure from the lamellar type gypsum disclosed in U.S. Pat. No. 3,862,881. The crystal structure of the gypsum of this invention is one which is found in the natural gypsum. On the other hand, the lamellar type gypsum in U.S. Pat. No. 3,862,881 is not found naturally.

The feature of the molded gypsum products of the present invention is to have the multi-layer structure having at least one higher density layer and at least one lower density layer which is continuously adjacent to said high density layer.

The multi-layer structure of the product of this invention as illustrated in FIG. 2(a) is different from that of a gypsum product composed of a lower density gypsum board and a high density gypsum board attached to each other with an adhesive which clearly defines the boundary surface as illustrated in FIG. 2(b).

Figure 1:
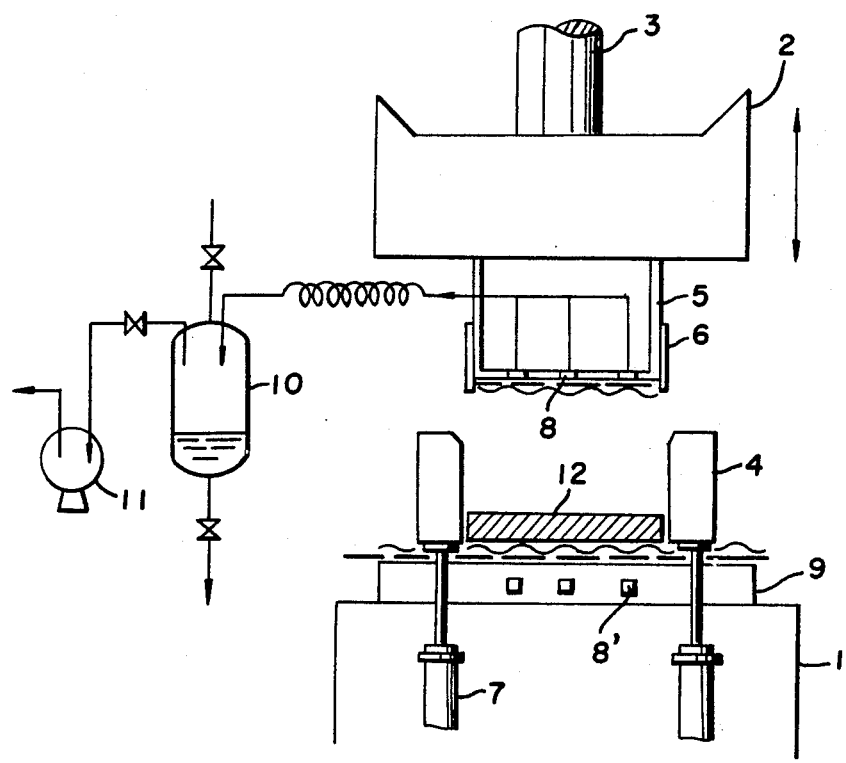
Figure 2A:
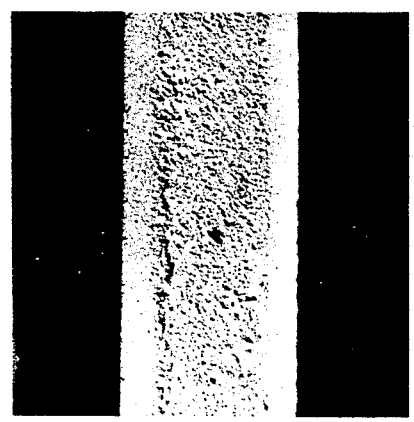
FIG. 2(a) is a photograph of the multilayered structure of the present invention.
Figure 2B:
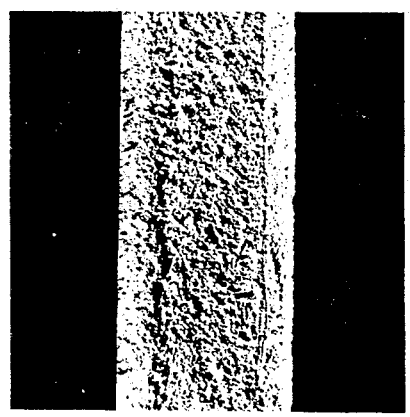
FIG. 2(b) is a photograph of a laminated multi-layered structure.

The photography of the vertical cross section of the gypsum product of this invention shows the integral multi-layer structure in which layers having different densities are continuously adjacent to each other. Therefore, the product of this invention, which has been produced without bonding process, does not separate in layers.

The higher density layer has a smooth and hard surface in high density and has high strength against concentrated load. On the other hand, the lower density layer contribute to lowering the weight of the molded product and high sound absorption can be attained by giving much porosity to the lower density layer. The molded product has excellent physical properties combining both advantages of the higher and lower density layers.

The thickness and density of each layer can be varied by selecting the specific gravity of the slurry of gypsum, the pressure for molding and the compressing speed in accordance with the process of the present invention whereby various molded gypsum products having a desired multi-layer structure can be obtained depending upon the purpose.

The product of the invention has a density of 0.2–0.7 g/cc in the lower density layer and a density of 0.4–1.5 g/cc in the higher density layer, the difference of the densities of the higher and lower density layers being not less than 0.1 g/cc preferably more than 0.4 g/cc. The thickness of each layer is generally 5–100 mm for the lower density layer and 3–30 mm for the higher density layer when use as construction materials is intended.

The process for preparing the molded gypsum product of the present invention will be illustrated.

The molded gypsum products of the present invention can be obtained by dispersing glass fiber and asbestos fiber in an aqueous slurry of hydraulic gypsum and compression-molding with the dehydration under the specific condition and then, setting it to convert the hydraulic gypsum into the crystalline gypsum and drying it.

The hemihydrate gypsum obtained by dehydration of dihydrate gypsum such as natural gypsum, by-product gypsum from phosphoric acid production or by-product gypsum from titanium production and gypsum from waste gas desulfurization, etc. can be used as the hydraulic gypsum and can be α-form hemihydrate gypsum and or β-form hemihydrate gypsum.

Commercially available asbestos products are conveniently used in this invention. In view of the fireproof property of the molded product, it is recommended to use asbestos having a fiber length distribution of 7D or more as determined by Quebec Standard test, those of 6D-4T being especially preferable in consideration of the processability and the cost.

Suitable asbestos include chrysotile, amosite, Crocidolite, etc. It is preferable to use chrysotile.

The asbestos is preferably used after beating treatment in water. The weight ratio of water to hydraulic gypsum in the process is selected from the below mentioned range.

The beating treatment can be conducted by using the conventional beaters such as a dissolver, a slash-finer, a discrefiner, a Henschel mixer, etc. The beating treatment is conducted to give a wet volume (cc) of 500 cc or more (the test method is stated in the following example).

From the viewpoint of the strength of the molded gypsum product, it is preferable to use long glass fiber. However, the handling of glass fiber is not easy if the length of glass fiber is too long. It is usual to use chopped strands having a length of 3 to 25 mm. The glass fiber can be treated with a sizing and coupling agent such as starch, polyvinyl acetate, silane, borane type, etc.

In the invention, it is possible to combine rock wool together with the asbestos and the glass fiber. The deflocked rock wool is usually used as rock wool without the beating process. The raw flock filling wool and the roll form wool can be also used.

In accordance with the process of the invention, the methods of preparing an aqueous slurry including the asbestos, the glass fiber and the rock wool, if added can be conducted. The following processes (a) to (c) are considered.

(a) Glass fiber is admixed with an aqueous slurry of asbestos prepared by the beating treatment to obtain an aqueous slurry containing asbestos and glass fiber and then the hydraulic gypsum is admixed with it.

(b) Hydraulic gypsum is admixed with an aqueous slurry of asbestos and then glass fiber and if necessary rock wool is admixed with it.

(c) A mixture of glass fiber and hydraulic gypsum powder if necessary with rock wool is admixed with an aqueous slurry of asbestos.

Among these processes, the process (a) is especially preferable because glass fiber can be especially uniformly dispersed in gypsum.

In the mixing treatment, it is preferable to use a mixer having a turbine stirrer, a paddle stirrer, propeller stirrer or the like so as to impart large shearing force to the mixture to attain enough mixing treatment. It is especially preferable to use a mixer equipped with an axial fan turbine.

The amounts of asbestos, glass fiber and rock wool are not critical and are usually 1 to 9 wt.% preferably 3 to 9 wt.% of asbestos, usually 0.1 to 5 wt.% preferably 0.5 to 5 wt.% of glass fiber, 3 to 15 wt.% of rock wool, based on the molded product.

The amount of water to be used in the above mixing treatment must be in excess of that necessary for hydraulation of the gypsum and enough to give a uniform distribution of the fibers, and is usually selected from a range of 1–4 times based on the weight of the hydraulic gypsum. As previously stated, reduction in weight of the molded product is attained by imparting porosity to the molded products by drying to remove excess water after compression. In the process of this invention, reduction in weight is further promoted by using an air entraining agent. In the case where an air entraining agent is used, a foamed slurry is prepared in the first place, and each ingredient is added thereto according to the method (a), (b) or (c) above.

The air entraining agent is not limited. Suitable air entraining agent include sodium alkyl sulfates, sodium alkyl benzenesulfonates, sodium polyoxyethylene alkylsufates, alkyl dimethyl benzyl ammonium chloride, sodium trioxyethylene alkyl sulfates, etc. as the surfactants.

The surfactant is usually used as an aqueous solution having 5 to 2000 ppm of the surfactant.

When a water soluble polymer such as polyvinyl alcohol, methyl cellulose, starch, urea resin, or phenolic resins is used together with the air entraining agent, the foams formed in the slurry of gypsum are stabilized, and the strength of the molded product can be preferably increased.

The amount of the polymer can be selected depending upon the use of the molded products. From the viewpoints of the noncombustibility and the fireproofing of the product, it is preferably 0.5 to 5 wt.%, especially about 1 to 3 wt.% based on the molded product.

In the invention, it is possible to further incorporate a reinforcing material such as pulp, vinylone fiber, acryl fiber, nylone fiber, cotton and other organic fibrous materials. The auxiliary agents for weight-lightening can be light mineral fillers such as calcined vermiculite, calcined pearlite, foamed water glass, etc.

The resulting aqueous slurry of hydraulic gypsum containing asbestos and glass fiber usually has an apparent density of 0.5 to 1.6 and has thixotropic fluidity.

In the compression-molding operation, the aqueous slurry is charged in a metal mold in a compression-molding machine and water is removed from the upper surface and/or the below surface of the metal mold. When water is removed from both of the upper surface and the below surface, a molded product having three layer structure is obtained. When water is removed from only one surface, a molded product having two layer structure is obtained.

In the compression-molding operation, the ratio of water to hydraulic gypsum (by weight) after the molding and the molding pressure are important factors. The molded product of the invention can be obtained by the selection of the factors. The weight ratio of water to hydraulic gypsum is in a range of 0.7 to 3.75.

The molding pressure is in a range of 0.05 to 20 $kg/cm^2G$ preferably 0.1 to 10 $kg/cm^2G$ especially 1 to 5 $kg/cm^2G$ when the molded product having three layer structure is prepared, and it is in a range of 1 to 75 $kg/cm^2G$ preferably 5 to 40 $kg/cm^2G$ when the molded product having two layer structure is prepared.

The compression-molding operation is usually conducted to reduce the weight ratio of water to hydraulic gypsum by at least 0.2.

Referring to FIG. 1, the compression-molding process will be further illustrated.

FIG. 1 is a schematic view of a compression-molding machine for preparing the molded gypsum product of the invention.

The compression-molding machine is a vertical type press which comprises a lower base table (1), an upper base table (2), a compressing cylinder (3), a female metal mold (4), a male metal mold (5), a slide plate (6) and a demolding unit (7).

In the compression-molding machine, a water discharging outlet (8) is formed in the male metal mold (5) and a water filtering plate (9) having a water discharging outlet (8') is formed between the female metal mold (4) and the lower base table (1) so as to discharge water from the upper and/or lower surface of the metal mold.

The outlet (8) is connected through a trap (10) to a vacuum pump (11).

Each mesh filter of sieve having about 10 to 250 mesh is disposed on each surface of the water filtering plate (9) and the male metal mold (5) so as to smoothly filter water from the slurry of gypsum.

The aqueous slurry of hdyraulic gypsum containing asbestos and glass fiber is charged immediately after the preparation (before the apparent set of gypsum) in the female mold (4) and is compression-molded by the male metal mold (5). The compressing speed is selected from the range of 1 mm/hour to 300 mm/sec. The compression-holding time is at least 1 minute.

When high pressure for reducing the thickness of the molded product is applied after the setting of gypsum, the multilayer structure of the molded product may be broken.

The setting time of gypsum can be adjusted by adding the conventional setting retardant such as sodium citrate or the setting accelerator such as potassium sulfate to the slurry of gypsum.

The molded product (12) formed by the compression-molding operation is demolded from the female metal mold (4) after setting, and is forcibly dried to obtain the product.

The reason why the multi-layer structure having at least one higher density layer and at least one lower density layer which is continuously adjacent to said higher density layer is formed, is not clear, but it is considered to be attributed to the special phenomena of dilatancy and/or rheopexy on the dehydrated surface of the slurry by the mechanical effect of the compression-molding because the slurry of gypsum has remarkable thixotropic fluidity.

The invention will be further illustrated by certain examples. In Examples 1 to 5, the light molded gypsum products having three layer structure are obtained. In Examples 6 and 7, the light molded gypsum products having two layer structure are obtained.

In the examples, the wet volume (cc) of asbestos was measured as follows:

The followings are various ranges for preferable embodiments.

A ratio of the apparent density of the higher density layer to that of the lower density layer is 1:0.1 to 0.9 preferably 1:0.1 to 0.7.

A ratio of thickness of the higher density to that of the lower density layer is 1:0.3 to 10 preferably 1:0.5 to 5.

Ratios of gypsum:glass fiber:asbestos: are 1:0.001 to 0.05:0.01 to 0.1 preferably 1:0.005 to 0.05:0.03 to 0.1.

Wet volume measurement

In a 2000 cc cylinder, 7.5 g of asbestos which has been treated by the beating treatment, is charged and water is filled to 2000 cc and the top is closed and the cylinder is inverted 30 times in a minute. After 10 minutes, the cylinder is inverted again in the same condition and is allowed to stand for 2 hours. The volume of asbestos (cc) in sedimentation is read out and expressed as the wet volume.

The thicknesses and apparent buld densities of the molded gypsum products and the thicknesses and apparent bulk densities of layers of the products and the results of the bending strength, thermal shrinkage and shock test measured by the below mentioned methods are shown in Tables 2 and 3.

Bending strength:
  Japanese Industrial Standard A-9510
Thermal shrinkage:
  Japanese Industrial Standard A-9510 (1000° C., 3 hr.)
Shock test:
  Japanese Industrial Standard A-1304 (10 kg weight).

In the examples and references, the following raw materials were used.

Hemihydrated gypsum:
  (manufactured by Yoshino Gypsum Co., Ltd.) α-form ® Highstone N form β-form ® Sakura Jirushi A grade
Polyvinyl alcohol:
  (manufactured by The Nippon Synthetic Chemical Industry Co., Ltd.)
  PVA ® N-300 (it is used as 5% aq. solution)
Glass fiber:
  (manufactured by Ashai Fiber Glass Co., Ltd.) chopped strand
  10 mm: starch sizing agent (® CS10HB 630B)
  13 mm: polyvinyl acetate sizing agent (® CS13 HB710)
Asbestos:
  (manufactured by Carey Co. in Canada)
Air entraining agent:
  (manufactured by Taiko Fat and Oil Co., Ltd.) sodium trioxyethylene alkylsulfate (® Taikol ESM)
Rock wool:
  (manufactured by NIPPON STEEL CHEMICAL CO., LTD.) deflocked rock wool (® S-fiber)

EXAMPLE 1

In a slash-finer, 128 wt. parts of water and 6.3 wt. parts of chrysotile (asbestos) having a fiber length distribution of 6D-1 (as measured by Quebec Standard test) were blended and beaten to give the wet volume of 500 cc.

The aqueous slurry of asbestos was fed into a mixer equipped with an axial fan turbine in which 128 wt. parts of 5% aqueous solution of polyvinyl alcohol and as an air entraining agent, 0.07 wt. part of sodium trioxyethylene alkylsulfate have been mixed to foam to a volume about 1.5 times of the initial volume. Then 4.0 wt. parts of glass fiber (chopped strand) having an average length of 10 mm was passed through a sieve having 30 mm of a stitch to add it into the mixture. Then, 102 wt. parts of β-form hemihydrated gypsum was added with stirring to obtain a slurry of gypsum having an apparent specific density of 0.83 (g/cc).

The slurry was immediately charged into the female metal mold in the compression-molding press shown in FIG. 1 and the slurry was compressed it under a pressure of 0.60 kg/cm$^2$G to remove water from both of the outlet (8) and (8'). After the setting and hardening, the product was demolded and dried at 80° C. for 36 hours in a hot air drier to obtain the molded gypsum product.

The dehydrating amount in the compression-molding operation was 95 wt. parts. Little or no leakage of gypsum was found.

EXAMPLES 2 to 5

In accordance with the process of Example 1, molded gypsum products were prepared under the conditions shown in Table 1.

Reference 1:

In accordance with the process of Example 1, except using no glass fiber in the preparation of the slurry of gypsum, the molded gypsum products were prepared by the condition in Table 1.

Reference 2:

In accordance with the process of Example 1, the slurry of gypsum containing glass fiber was charged into the female metal mold and was set and demolded and dried to obtain a molded gypsum product.

EXAMPLE 7

In a mixer equipped with an axial fan turbine, 109.5 wt. parts of water, 172.2 wt. parts of a 5% aqueous solution of polyvinyl alcohol and as an air entraining agent, 0.25 wt. part of trioxyethylene alkyl sulfate were charged. The mixture was foamed to be about 2.9 times in volume with stirring.

A slurry prepared by the beating treatment of a mixture of 63.1 wt. parts of water and 8.6 wt. parts of chrysotile asbestos in a dissolver to be the wet volume of 500 cc, was added to the foamed solution and then 3.7 wt. parts of glass fiber was added to thoroughly mix them with stirring.

Then, 137.2 wt. parts of hemihydrated gypsum was added with stirring to obtain a slurry of gypsum having an apparent specific density of 0.57 (g/cc).

The slurry was immediately charged in a female metal mold of the compression-molding machine shown in FIG. 1 and was compressed it under the pressure of 1.6 kg/cm$^2$G to remove water from only the outlet (8). After the setting and hardening, the product was demolded and dried at 80° C. for 48 hours by a hot air drier to obtain a molded gypsum product having two layer structure.

EXAMPLE 8

In accordance with the process of Example 7, except foaming to 1.5 times in volume and adding 3.0 wt. parts of rock wool, the slurry of gypsum having an apparent specific density of 0.7 (g/cc) was obtained, and the slurry was molded under a pressure of 20 kg/cm$^2$G to remove water and was dried at 80° C. for 36 hours by a hot air drier to obtain a molded gypsum product having a thickness of 45 mm and an apparent bulk density of 0.58 (g/cc).

Reference 3

In accordance with the process of Example 7, except adding no glass fiber, a molded gypsum product was prepared. The lower filter was clogged with gypsum and asbestos just after the compression and accordingly, the slurry was set and hardened without further compression. The resulting molded gypsum product was not of two layer structure.

Reference 4

In accordance with the process of Example 8, except adding no asbestos, a slurry of gypsum was prepared.

The distribution of the glass fiber in the slurry was not uniform.

In accordance with the process of Example 8, the slurry was compressed while removing water to mold it. Many fiber lumps were formed in the lower layer (near the dehydrated surface) in nonuniform and the molded gypsum product was not of two layer structure.

Table 1

| Test No. | Example 1 | 2 | 3 | 4 | 5 |
|---|---|---|---|---|---|
| Components:* | | | | | |
| hemihydrate gypsum | β-form 102 | β-form 204 | β-form 102 | β-form 102 | β-form 132 |
| asbestos | (6D-1) (10 mm) 4.0 | (5R-1) (10 mm) 8.0 | (5R-1) (13 mm) 4.0 | (6D-1) (10 mm) 4.0 | (5R-1) (10 mm) 5.2 |
| glass fiber | 6.4 | 6.6 | 3.3 | 3.3 | 4.4 |
| PVA | | | | | |
| air entraining agent | 0.07 | — | 0.12 | 0.20 | 0.03 |
| total water | 252 | 500 | 151 | 251 | 226 |
| rock wool | — | — | — | — | — |
| weight ratio of water/CaSO$_4 \cdot \frac{1}{2}$H$_2$O | 2.48 | 2.45 | 1.48 | 2.46 | 1.71 |
| apparent density of slurry (g/cc) | 0.83 | 1.12 | 0.69 | 0.49 | 1.13 |
| Compression-molding condition: | | | | | |
| pressure(kg/cm$^2$G) | 0.60 | 0.35 | 0.20 | 0.13 | 2.5 |
| weight ratio of water/CaSO$_4 \cdot \frac{1}{2}$H$_2$O | 1.54 | 1.88 | 1.02 | 1.71 | 1.01 |

| Test No. | Reference 1 | 2 | Example 6 | 7 | Reference 3 | 4 |
|---|---|---|---|---|---|---|
| Components:* | | | | | | |
| hemihydrate gypsum | β-form 153 | β-form 102 | β-form 137 | β-form 137 | β-form 137 | β-form 137 |
| asbestos | (5R-1) 9.2 | (6D-1) 6.3 | (6D-1) 8.6 | (6D-1) 8.6 | (6D-1) 8.6 | — |

Table 1-continued

| | | | | | | |
|---|---|---|---|---|---|---|
| glass fiber | — | (10 mm) 4.0 | (10 mm) 3.7 | (10 mm) 3.7 | — | (10 mm) 3.7 |
| PVA | 4.9 | 6.4 | 8.6 | 8.6 | 8.6 | 8.6 |
| air entraining agent | 0.15 | 0.07 | 0.25 | 0.25 | 0.25 | 0.25 |
| total water | 195 | 252 | 336 | 336 | 336 | 336 |
| rock wool | — | — | — | 3.0 | — | 3.0 |
| weight ratio of water/ $CaSO_4 \cdot \frac{1}{2}H_2O$ | 1.27 | 2.47 | 2.44 | 2.44 | 2.44 | 2.44 |
| apparent density of slurry (g/cc) | 0.89 | 0.83 | 0.57 | 0.70 | 0.57 | 0.70 |
| Compression-molding condition: | | | | | | |
| pressure(kg/cm²G) | 0.20 | 0 | 16 | 16 | 16 | 16 |
| weight ratio of water/ $CaSO_4 \cdot \frac{1}{2}H_2O$ | >1.00 | — | 1.17 | 1.03 | — | — |

*All components are given in parts by weight.

Table 2

| Test No. | | Thickness (mm) | Apparent bulk density of three layer structure (g/cc) and thickness (mm)*** | | | Apparent bulk density of molded product (g/cc) | Bending strength (kg/cm²) | Thermal shrinkage (%) | Shock test |
|---|---|---|---|---|---|---|---|---|---|
| | | | Front surface | Core | Rear surface | | | | |
| Example | 1 | 47 | (0.68) 5 | (0.40) 37 | (0.68) 5 | 0.46 | 40.5 | 7.1 | good |
| | 2 | 87 | (0.85) 5 | (0.48) 77 | (0.85) 5 | 0.52 | — | — | — |
| | 3 | 48 | — | — | — | 0.46 | 25.3 | 5.6 | — |
| | 4 | 47 | (0.80) 8 | (0.27) 31 | (0.80) 8 | 0.45 | 15.2 | 5.7 | — |
| | 5 | 48 | (0.8) 5 | (0.69) 30 | (0.80) 5 | 0.72 | — | — | — |
| Reference | 1 | 50 | no three layer structure | | | 1 | — | — | — |
| | 2 | 50 | no three layer structure | | | 0.46 | 20.0 | — | — |

Note: ***(): apparent density

Table 2

| Test No. | | Thickness (mm) | Apparent bulk density of two layer structure (g/cc) and thickness (mm)*** | | Apparent bulk density of molded product (g/cc) | Bending strength (kg/cm²) | Thermal shrinkage (%) | Shock test |
|---|---|---|---|---|---|---|---|---|
| | | | Front surface | Rear surface | | | | |
| Example | 6 | 55 | (1.04) 10 | (0.43) 45 | 0.54 | 15 | 6.0 | good |
| | 7 | 45 | (1.25) 5 | (0.50) 40 | 0.58 | 18 | — | — |
| Reference | 3 | — | no two layer structure | | — | — | — | — |
| | 4 | — | no two layer structure | | 1> | — | — | — |

Note: *** (): apparent density

What is claimed is:

1. A process for preparing a molded gypsum product containing from 0.1 to 5 wt. % of glass fiber and from 1 to 9 wt.% of asbestos fiber and having an apparent bulk density of from 0.3 to 0.9 g/cc, which comprises the steps of (1) mixing a hydraulic gypsum, water and reinforcing fibers of at least glass fiber and asbestos fiber to obtain a slurry, (2) charging said slurry in a mold of a compression-molding machine, (3) compression molding said slurry under a pressure of from 0.05 to 20 kg/cm²G to remove the excess water from the upper and lower surfaces of the mold to form a molded product having a preselected weight ratio of water to hydraulic gypsum, and (4) setting and drying said molded material to form a three-layered structure composed of three continuous layers consisting of two outer layers of higher density having an apparent bulk density of from 0.4 to 1.5 g/cc and one middle layer of lower density having an apparent bulk density of from 0.2 to 0.7 g/cc, wherein the difference in apparent bulk densities of said higher and lower density layers is not less than 0.1 g/cc.

2. A process for preparing a molded gypsum product according to claim 1 in which an air entraining agent is used in said mixing step.

3. A process for preparing a molded gypsum product containing from 0.1 to 5 wt.% of glass fiber and from 1 to 9 wt.% of asbestos fiber and having an apparent bulk density of from 0.3 to 0.9 g/cc, which comprises the steps of (1) mixing a hydraulic gypsum, water and reinforcing fibers of at least glass fiber and asbestos fiber to obtain a slurry, (2) charging said slurry in a mold of a compression-molding machine, (3) compression molding said slurry under a pressure of 1–75 kg/cm$^2$G to remove water from either the upper surface or the lower surface of the mold to form a molded product having a preselected weight ratio of water to hydraulic gypsum, and (4) setting and drying said molded material to form a two-layered structure composed of two continuous layers consisting of a higher density layer having an apparent bulk density of from 0.4 to 1g/cc and a lower density layer having an apparent bulk density of from 0.2 to 0.7g/cc, wherein the difference in apparent bulk densities of said higher and lower density layers is not less than 0.1g/cc.

4. A process for preparing a molded gypsum product according to claim 3 in which an air entraining agent is used in said mixing step.

* * * * *